(12) United States Patent
Lee et al.

(10) Patent No.: US 8,693,449 B2
(45) Date of Patent: Apr. 8, 2014

(54) METHOD OF ALLOCATING AND WITHDRAWING TIME SLOT USING POSITION MOVEMENT OF TIME SLOT AND TDMA COMMUNICATION SYSTEM USING THE SAME

(75) Inventors: Ju Hyung Lee, Seoul (KR); Sang Jun Kim, Seoul (KR); Man Yeob Lim, Seoul (KR); Joon Young Cho, Seoul (KR); Jong Sung Kim, Seoul (KR)

(73) Assignee: Agency for Defense Development, Daejeon (KR)

( * ) Notice: Subject to any disclaimer, the term of this patent is extended or adjusted under 35 U.S.C. 154(b) by 253 days.

(21) Appl. No.: 13/333,546

(22) Filed: Dec. 21, 2011

(65) Prior Publication Data

US 2012/0163351 A1    Jun. 28, 2012

(30) Foreign Application Priority Data

Dec. 22, 2010    (KR) ........................ 10-2010-0132167

(51) Int. Cl.
*H04J 3/00*        (2006.01)
(52) U.S. Cl.
USPC .......................................................... 370/337

(58) Field of Classification Search
None
See application file for complete search history.

(56) References Cited

PUBLICATIONS

Navy Center for Tactical Systems Interoperability, Understanding Link-16 : A Guidebook for New Users, pp. 5(10)-5(16), Sep. 2001.

*Primary Examiner* — John Blanton
(74) *Attorney, Agent, or Firm* — Harness, Dickey & Pierce, P.L.C.

(57) ABSTRACT

The present invention relates to a TDMA communication system using the position movement of a time slot. The TDMA communication system includes a TDMA network, a network central station, and terminals. The network central station includes a receiver for receiving transmission cycle information and time slot allocation requests from the terminals, a network central station controller for writing a degree of identification for the number of cases of time slot allocation according to the information transmission cycle, searching for an allocable optimum time slot, and withdrawing a time slot from a terminal which has finished communication, a time slot management unit for allocating a time slot to the terminal based on degree of identification for the number of cases of time slot allocation written by the network central station controller, and a transmitter for transmitting information about the allocated time slot to the terminal.

8 Claims, 14 Drawing Sheets

METHOD OF ALLOCATING AND WITHDRAWING TIME SLOT USING POSITION MOVEMENT OF TIME SLOT AND TDMA COMMUNICATION SYSTEM USING THE SAME

CROSS REFERENCE TO RELATED APPLICATION

This application claims the benefit of Korea Patent Application No. 10-2010-0132167 filed on Dec. 22, 2010, which is incorporated herein by reference for all purposes as if fully set forth herein.

BACKGROUND OF THE INVENTION

Field of the Invention

The present invention relates to a method of allocating and withdrawing a time slot using the position movement of a time slot in a Time Division Multiple Access (TDMA) communication system, which is capable of improving the use efficiency of time slots by controlling the position movement of the existing allocated time slots and a TDMA communication system using the same.

A multiple access scheme refers to a method of several terminal devices sending signals through one communication channel in a form in which the signals are combined in order to efficiently use a limited transmission path and separating the signals in their original forms on their receiving sides. The multiple access scheme includes a TDMA scheme, a Frequency Division Multiple Access (FDMA) scheme, and a Code Division Multiple Access (CDMA) scheme. A terminal that has subscribed a communication network requests the amount of required radio communication resources to a network central station according to the amount of data to be sent. In response to the request of the terminal, the network central station allocates proper radio communication resources to the terminal on the basis of the present condition that communication resources are now being used. The terminal to which the radio communication resources have been allocated by the network central station exclusively uses the radio communication resources. When communication is finished, the terminal returns the used radio communication resources to the network central station.

The term 'TDMA system' refers to a system in which the unit of the radio communication resources is a time slot and refers to a system in which a number of terminals temporally divide the same frequency band through multiple access by the medium of one relay station and perform signal communication so that signals do not overlap with each other. The TDMA system is chiefly used in digital cellular communication. That is, the TDMA system refers to a system using a method of several terminals temporally dividing the same frequency band and sending signals during only their time slots allocated thereto. If the TDMA method is used, different time slots are allocated to respective terminals, so that a collision of transmission signals can be prevented.

In a conventional TDMA scheme, the data transmission time of one transmission path is divided into specific time widths irrespective of the amount of data to be actually sent. Accordingly, there is a problem in that efficiency is low because all time slots already allocated are allocated to only relevant terminals even when information having a transmission cycle longer than an allocated time slot is transmitted.

In order to solve the problem, there have been proposed a method and apparatus for managing time slots using an algorithm for allocating an optimum time slot by taking the number of cases of time slot allocation into consideration when a terminal requests a time slot to be allocated thereto according to the amount of information to be transmitted.

In accordance with the method and apparatus for managing time slots, an optimum time slot may be selected at a point of time when the time slot is allocated. However, the method and apparatus for managing time slots is problematic in that, if another terminal returns a time slot after a time slot was allocated, the existing optimum time slot is no longer an optimum time slot, thereby lowering time slot operating efficiency.

SUMMARY OF THE INVENTION

Accordingly, the present invention has been made in view of the above problems occurring in the prior art, and it is an object of the present invention to provide a method of allocating and withdrawing a time slot using the position movement of a time slot, which secures a time slot by controlling the existing allocated time slot in a TDMA communication system.

It is another object of the present invention to provide a TDMA communication system using the method of allocating and withdrawing a time slot using the position movement of a time slot, which secures a time slot by controlling the existing allocated time slot in a TDMA communication system.

A method of allocating a time slot using the position movement of a time slot according to an object of the present invention includes the steps of writing the degree of identification for the number of cases of time slot allocation, initiating the operation of a communication network, determining whether transmission cycle information and a time slot allocation request have been received from a terminal, and searching for an allocable time slot based on the transmission cycle information and the degree of identification. Here, the method further includes the steps of if, as a result of the determination, an allocable time slot does not exist, moving the position of the existing allocated time slot, determining whether a time slot to be allocated to the terminal has been secured, if, as a result of the determination, a time slot to be allocated to the terminal has been secured, allocating the secured time slot to the terminal, and updating the degree of identification for the number of cases of time slot allocation.

The method of allocating a time slot using the position movement of a time slot according to a detailed object of the present invention further includes the steps of if an allocable time slot exists as a result of searching for the allocable time slot based on the transmission cycle information and the degree of identification of the terminal, allocating the allocable time slot to the terminal, and updating the degree of identification for the number of cases of time slot allocation.

The method of allocating a time slot using the position movement of a time slot according to a detailed object of the present invention further includes the step of informing that a time slot cannot be allocated to the terminal, if a time slot to be allocated to the terminal has not been secured even though the position of the existing allocated time slot has been moved.

A method of withdrawing a time slot using the position movement of a time slot according to another object of the present invention includes the steps of checking the degree of identification for the number of cases of time slot allocation, determining whether a time slot withdrawal request has been received from a terminal, updating the degree of identification for the number of cases of time slot allocation according to a withdrawal of a time slot, and determining whether the use of all time slots can be optimized through a position movement of an existing allocated time slot. Here, the method further includes the steps of if, as a result of the determination, the use of all the time slots can be optimized through the position movement of the existing allocated time slot, moving the position of the existing allocated time slot, and updating the degree of identification for the number of cases of time slot allocation.

In a Time Division Multiple Access (TDMA) communication system including a TDMA network, a network central station, and terminals according to yet another object of the present invention, the network central station includes a receiver for receiving information transmission cycles and time slot allocation requests from the terminals, a network central station controller for writing the degree of identification for the number of cases of time slot allocation according to the information transmission cycle, searching for an allocable optimum time slot, and withdrawing a time slot from a terminal which has finished communication, a time slot management unit for allocating a time slot to the terminal based on the number of cases of time slot allocation written by the network central station controller, and a transmitter for transmitting information about the allocated time slot to the terminal. Here, the network central station controller searches for a time slot of a transmission cycle that has been requested by the terminal through a position movement of a time slot, and the time slot management unit allocates the searched time slot to the terminal.

In the TDMA communication system according to a detailed object of the present invention, if the position of the time slot has been moved, the network central station controller updates the degree of identification for the number of cases of time slot allocation.

In the TDMA communication system according to a detailed object of the present invention, if an allocable time slot is not searched by searching for a time slot of a transmission cycle that has been requested by the terminal through the position movement of the time slot, the network central station controller informs that a time slot cannot be allocated to the terminal.

In the TDMA communication system according to a detailed object of the present invention, the terminal includes a transmitter for transmitting information about the transmission cycle and the time slot allocation request to the network central station and transmitting information about a time slot withdrawal request when communication is finished, a receiver for receiving time slot allocation information from the network central station, and a controller for operating time slots based on the time slot allocation information.

BRIEF DESCRIPTION OF THE DRAWINGS

Further objects and advantages of the invention can be more fully understood from the following detailed description taken in conjunction with the accompanying drawings in which.

DETAILED DESCRIPTION OF EMBODIMENTS

Some exemplary embodiments of the present invention will now be described in detail with reference to the accompanying drawings.

Figure 1:
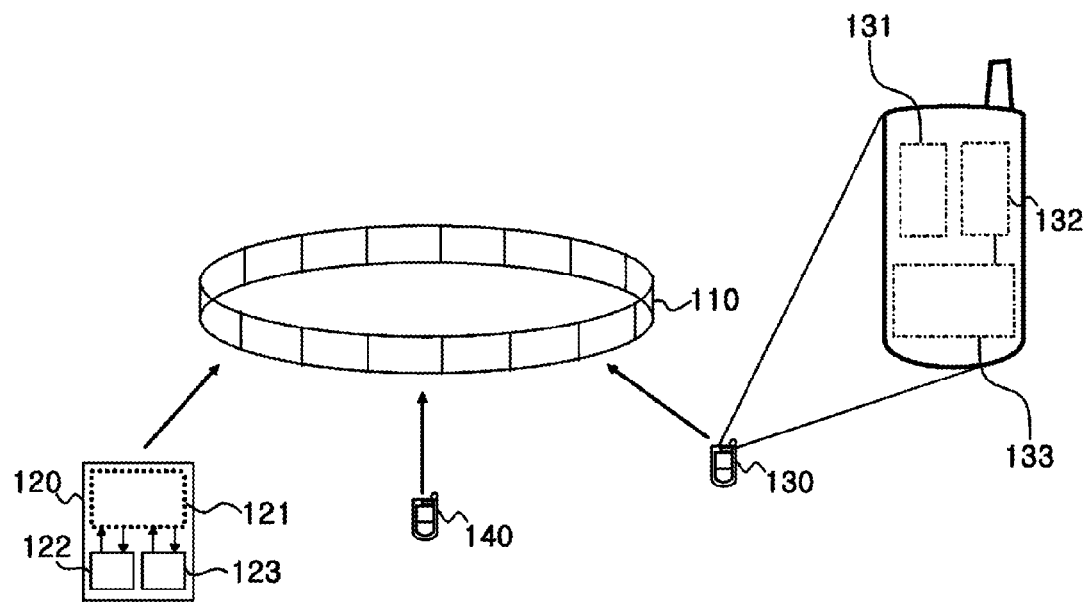
FIG. 1 is a conceptual diagram showing the configuration of a TDMA communication system according to the present invention.

FIG. 1 is a conceptual diagram showing the configuration of a TDMA communication system according to the present invention. As shown in FIG. 1, in the TDMA communication system composed of a TDMA network 110, a network central station 120, and terminals 130 and 140, the network central station 120 includes a network central station controller 121 for writing the degree of identification for the number of cases of time slot allocation according to an information transmission cycle, searching for an allocable time slot using an optimized algorithm, and withdrawing a time slot from a terminal that has finished communication, a time slot management unit 122 for allocating an optimum allocable time slot to the terminal based on the number of cases of time slot allocation so that has been written by the network central station controller 121, and a transceiver 123 for transmitting and receiving time slot-related information to and from the terminals. If an allocable time slot is not searched or the present use condition of all time slots is to be maintained in an optimum state, the network central station controller 121 searches for a time slot having a transmission cycle requested by a terminal through the position movement of a time slot. The time slot management unit 122 allocates the searched time slot to the relevant terminal.

The terminal may include a transmitter 131 for transmitting the transmission cycle information and the time slot allocation request information to the network central station 129 and transmitting time slot withdrawal request information when communication is finished, a receiver 132 for receiving time slot allocation information from the network central station 120, and a controller 13 for operating the time slot based on the time slot allocation information.

Each of the elements is described in detail below. Each of the terminals transmits information to other terminals over the TDMA network 100. Here, the network central station controller 121 of the network central station 120 searches for a proper time slot using an optimized algorithm based on the information transmission cycle of the terminal. If there is no proper time slot allocable to the terminal or the use present condition of all time slots is sought to be maintained in an optimum state, the network central station controller 121 searches for a time slot having a transmission cycle that has been requested by the terminal through the position movement of the existing allocated time slot. If a proper time slot is searched through the above process, the network central station controller 121 of the network central station 120 allocates the proper time slot to the terminal through the time slot management unit 122 and provides information about the allocated time slot to the terminal through the transceiver 123. The terminal receives the time slot allocation information through the receiver 132 and performs communication by controlling a transmission signal so that information is transmitted through the time slot allocated by the controller 133.

Furthermore, in the case where the time slot is searched through the position movement of the time slot, the network central station controller 121 may update the degree of identification for the number of cases of the allocated time slot. Meanwhile, if an allocable time slot is not searched by searching for a time slot having a transmission cycle that has been requested by the terminal through the position movement of the time slot, the network central station controller 121 may notify that a time slot cannot be allocated to the terminal.

An embodiment of a TDMA communication method is described below.

Figure 2:
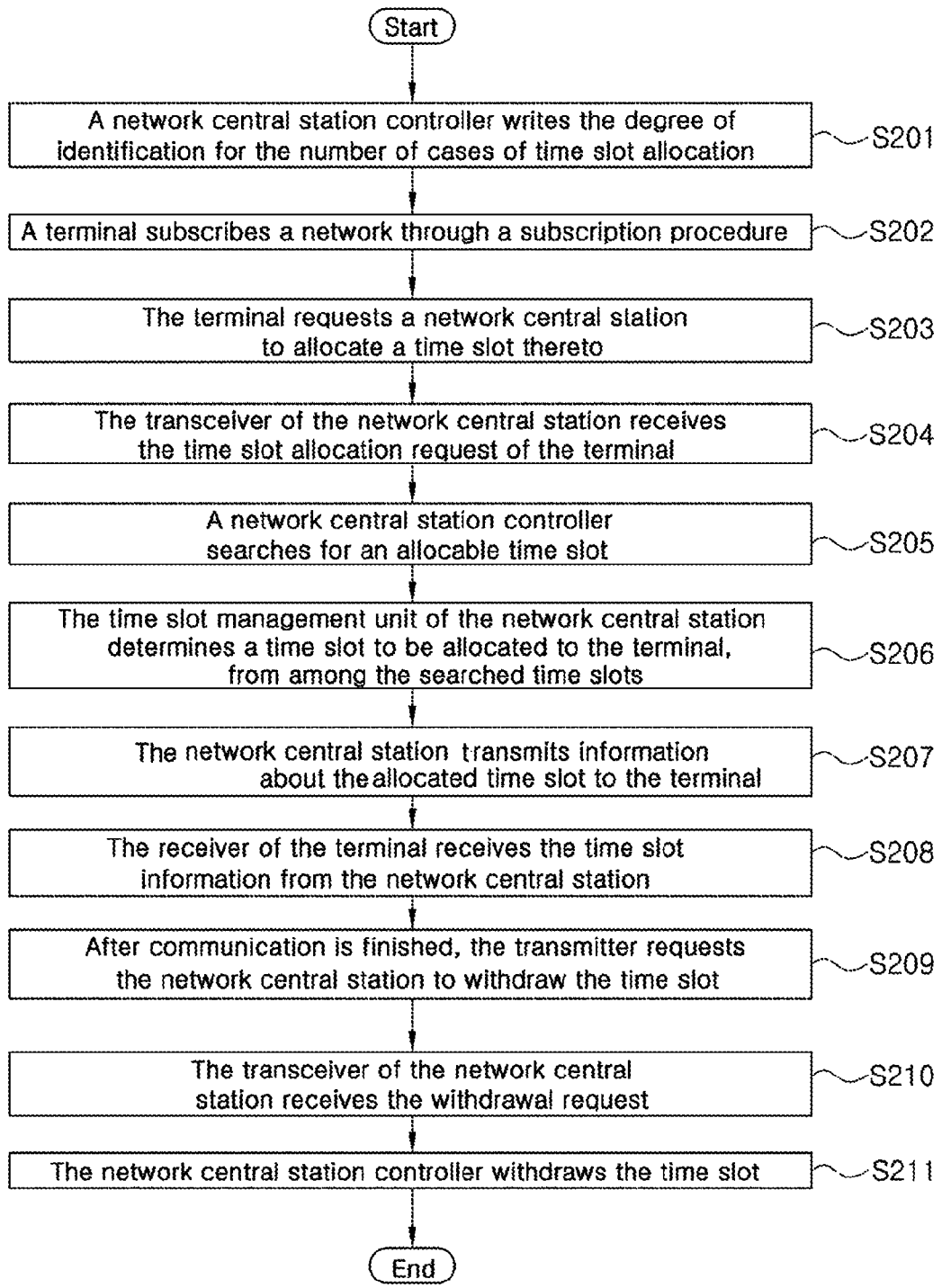
FIG. 2 is a flowchart illustrating a process of allocating and withdrawing a time slot between a network central station and a terminal.

FIG. 2 is a flowchart illustrating a process of allocating and withdrawing a time slot between the network central station 120 and the terminal. As shown in FIG. 2, before communication is started, the network central station controller 121 writes the degree of identification for the number of cases of time slot allocation according to a transmission cycle at step S201. After the degree of identification for the number of cases of time slot allocation is written, the network central station 120 starts operating the TDMA network. When the TDMA network is operated, each of the terminals obtains initial synchronization and subscribes the TDMA network through a network subscription procedure at step S202. The transmitter 131 of the terminal that has completed the network subscription procedure requests the network central station 120 to allocate a time slot thereto by reporting a transmission cycle of information to be sent to other terminals to the network central station 120 at step S203. The transceiver 123 of the network central station 120 receives the time slot allocation request of the terminal at step S204. Next, the network central station controller 121 searches for a time slot requested by the terminal at step S205. The time slot management unit 122 of the network central station 120 determines a time slot to be allocated to the terminal, from among the searched time slots, at step S206. The transceiver 123 of the network central station transmits information about the time slot, determined by the time slot management unit 122, to the terminal at step S207. The receiver 132 of the terminal receives the time slot information from the network central station 120 at step S208 and transmits information through the allocated time slot over a network. After the information is transmitted, the transmitter 131 of the terminal requests the network central station 120 to withdraw the time slot, allocated to the terminal at step S209. The transceiver 123 of the network central station 120 receives the withdrawal request at step S210. If there is the time slot withdrawal request from the terminal, the network central station controller 121 withdraws the time slot, allocated to the terminal, according to a withdrawal algorithm over the TDMA network at step S211.

Figure 3A:
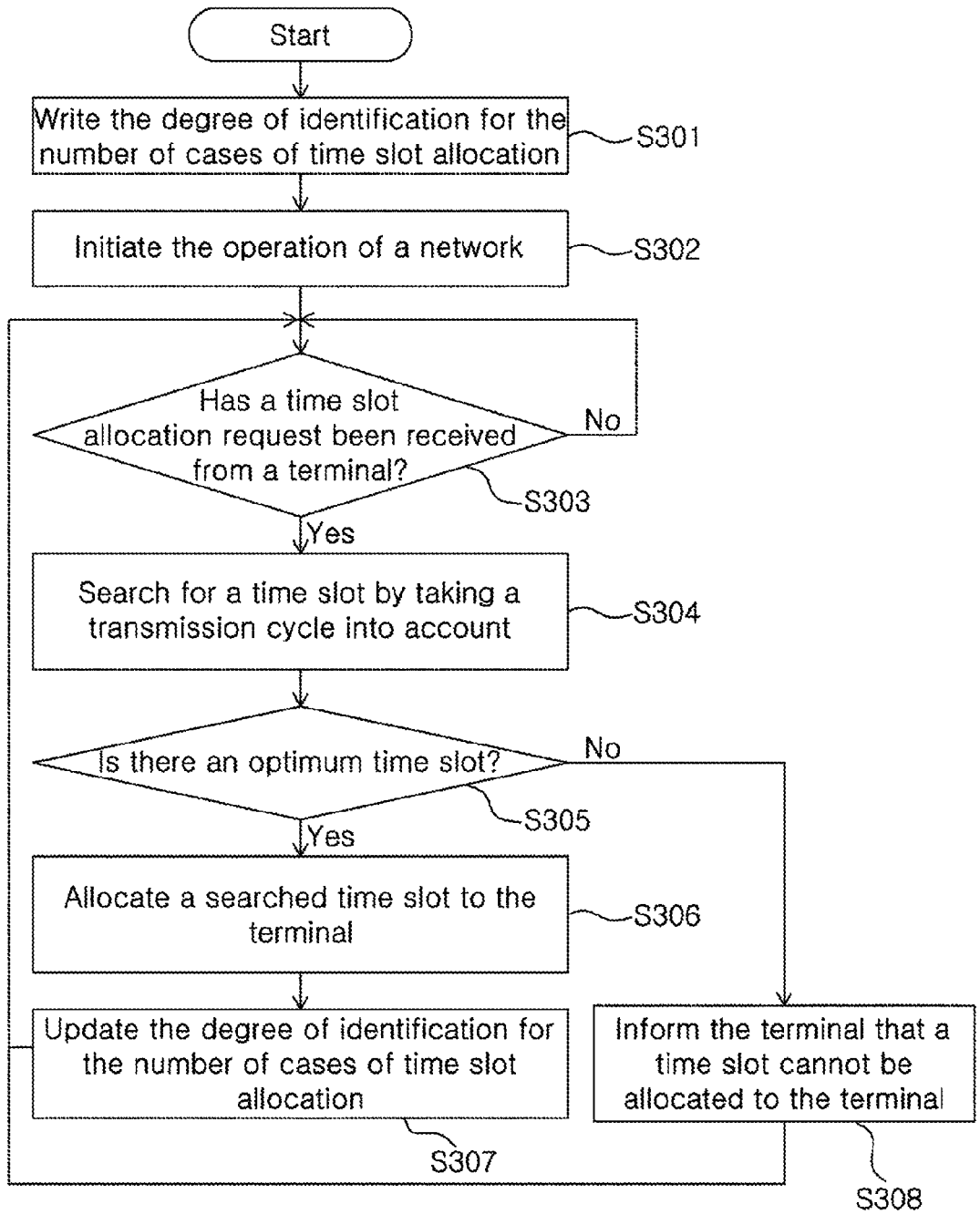
FIG. 3A is a flowchart illustrating a conventional method of allocating a time slot.

FIG. 3A is a flowchart illustrating a conventional method of allocating a time slot. In a process of allocating a time slot between the network central station 120 and the terminal, the network central station controller 121 uses the method of FIG. 3A. As shown in FIG. 3A, the conventional method of allocating a time slot may include the step S301 of writing the degree of identification for the number of cases of time slot allocation, the step S302 of initiating the operation of the TDMA network, the step S303 of receiving transmission cycle information and a time slot allocation request from the terminal, the step S304 of searching for an optimum time slot for the transmission cycle information through the degree of identification for the number of cases of time slot allocation, the step S305 of determining whether there is an optimum time slot, the step S306 of allocating the optimum time slot to the terminal if, as a result of the determination, the optimum time slot exists, and the step S307 of updating the degree of identification for the number of cases of time slot allocation. Furthermore, the conventional method may further include the step S308 of informing the terminal that a time slot cannot be allocated to the terminal, if, as a result of the determination, the optimum time slot does not exist.

Figure 3B:
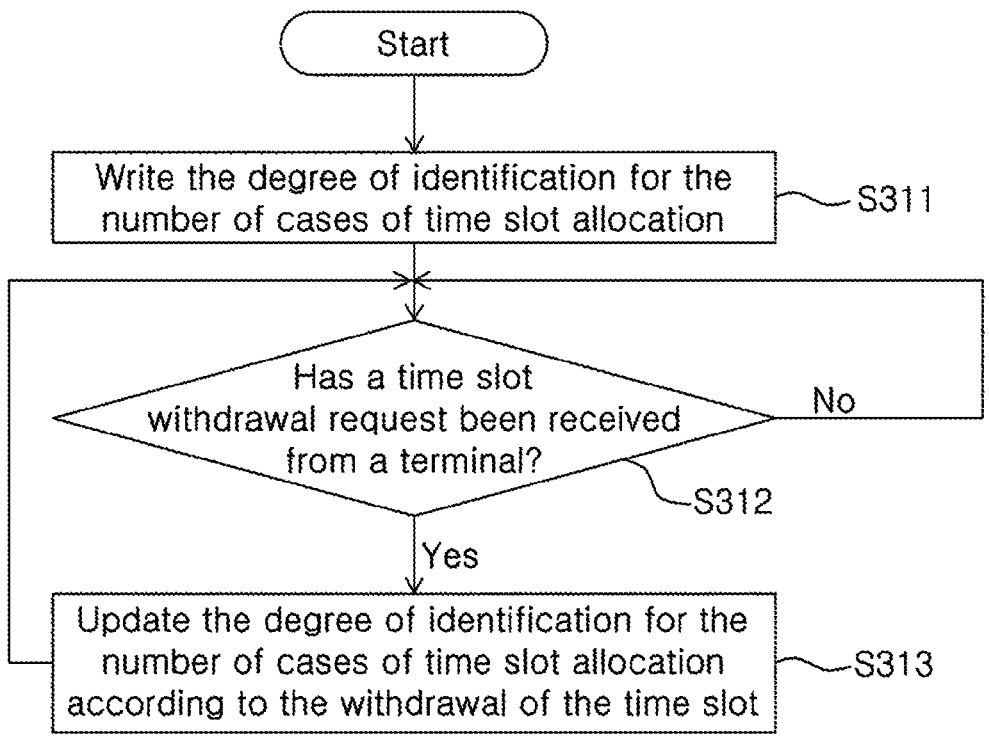
FIG. 3B is a flowchart illustrating a conventional method of withdrawing a time slot.

FIG. 3B is a flowchart illustrating a conventional method of withdrawing a time slot. In the process of withdrawing a time slot between the network central station 120 and the terminal, the network central station controller 121 uses the method of FIG. 3B. As shown in FIG. 3B, the conventional method of withdrawing a time slot includes the step S311 of writing the degree of identification for the number of cases of time slot allocation when the withdrawal of a time slot is started, the step S312 of receiving a time slot withdrawal request from the terminal, and the step S313 of updating the degree of identification for the number of cases of time slot allocation according to the withdrawal of the time slot.

FIGS. 4A to 4F are exemplary diagrams illustrating a conventional method of allocating and withdrawing a time slot. In order to help understanding of and describe the problems of the conventional method of allocating a time slot shown in FIG. 3A, an embodiment of the method is described below. In order to describe the embodiment, it is assumed that the TDMA communication system used in the embodiment is 12 seconds in the size of a frame, 6 seconds in a minimum transmission cycle, and 48 seconds in a maximum transmission cycle.

Figure 4A:
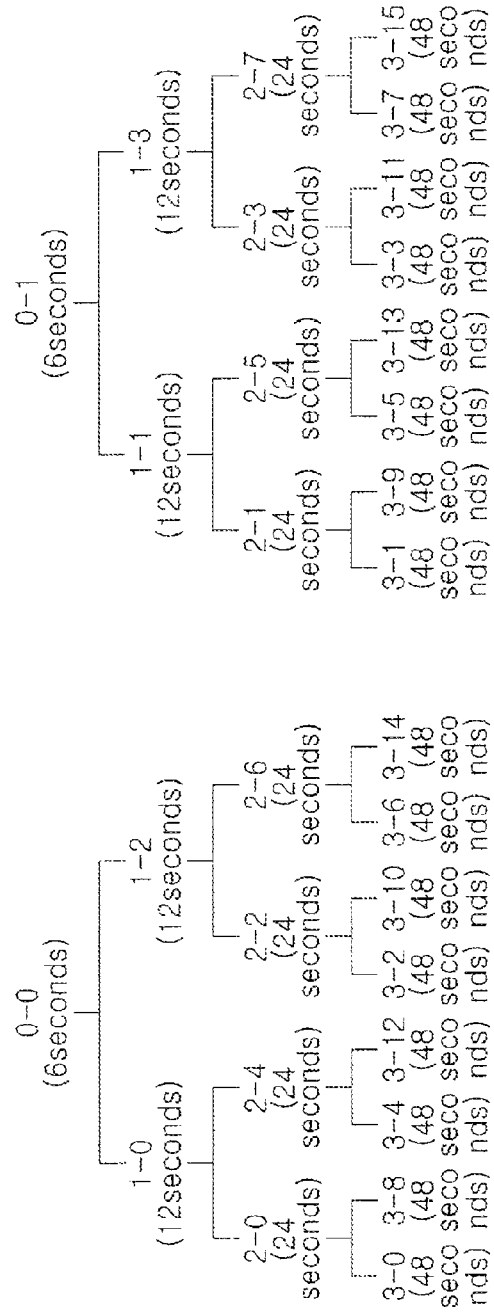
FIGS. 4A to 4F are exemplary diagrams illustrating a conventional method of allocating and withdrawing a time slot.

As shown in FIGS. 4A to 4F, one frame consists of 4 time slots. The time slots are controlled by the network central station 120. Before performing communication with a first terminal, the time slot management unit 122 of the network central station 120 resets the number of cases of allocation for each time slot. Here, the reset process includes the step of checking whether a message having what transmission cycle can be allocated to each time slot. Accordingly, before communication with the first terminal is performed, the degree of identification for the number of cases of time slot allocation becomes a state in which any time slot has not been allocated as shown in FIG. 4A. In FIG. 4A to 4E, 0-X, 1-X, 2-X, and 3-X refer to messages having respective transmission cycles of 6 seconds, 12 seconds, 24 seconds, and 48 seconds. That is, if a terminal requests the network central station 120 to allocate the message, having the transmission cycle of 12 seconds, thereto, the network central station 120 selects a time slot that may use radio resources most efficiently, from among times slots 1-0 to 1-3, and allocates the selected time slot. This means that time slots are allocated so that the time slots as many as possible can be allocated to terminals if one or more terminals request the allocation of the time slots at the same time or subsequently.

As shown in FIG. 4A, if the terminal requests the time slot for information having the transmission cycle of 24 seconds in the state in which the time slot management unit 122 of the network central station 120 has been reset, the network central station 120 selects a time slot that may maximize the utilization of radio resources in the state in which a current time slot has been allocated. The network central station 120 may randomly select one time slot from among time slots 2-0 to 2-7 because any time slot has not yet been allocated and may allocate the selected time slot. The time slots 0-0, 1-0, 2-0, 3-0, and 3-8 are shared. If the time slot 2-0 is assumed to have been allocated as in the present example, the time slots 0-0, 1-0, 3-0, and 3-8 cannot be allocated because the time slot 2-0 has been allocated. Such allocation is shown in FIG. 4B.

Figure 4B:
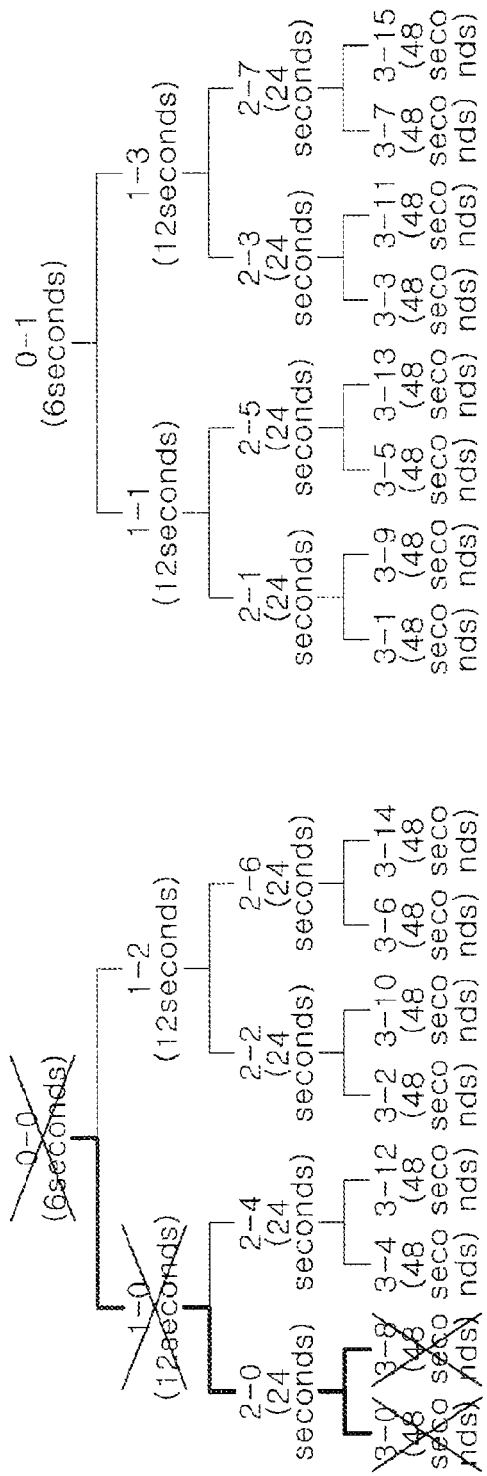
Figure 4C:
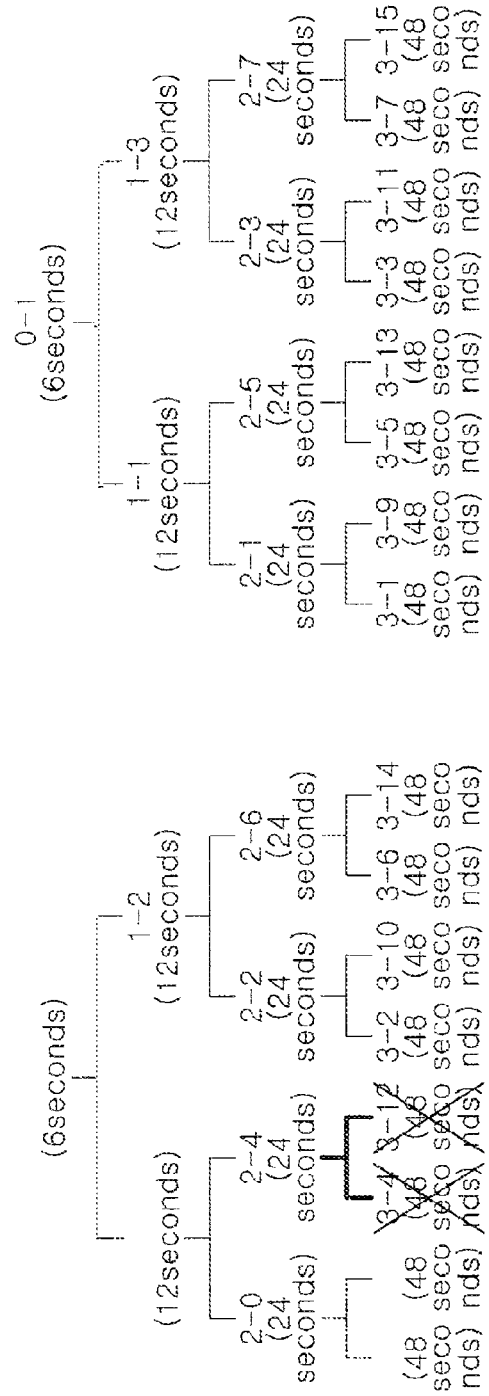

In the state of FIG. 4B, if another terminal requests the allocation of a time slot for the 24-seconds transmission cycle message, it is most advantageous that the time slot management unit 122 of the network central station 120 allocates the time slot 2-4 from among the selectable time slots 2-1 to 2-7. The reason why it is most advantageous when the time slot 2-4 is allocated is that only the number of cases of allocation for the time slots 3-4 and 3-12 disappears because the time slot 2-0 has already been allocated although the time slot 2-4 is additionally allocated and thus the number of subsequently allocable time slots is increased. FIG. 4C shows the degree of identification for the number of cases of time slot allocation after the time slot 2-4 was allocated.

Figure 4D:
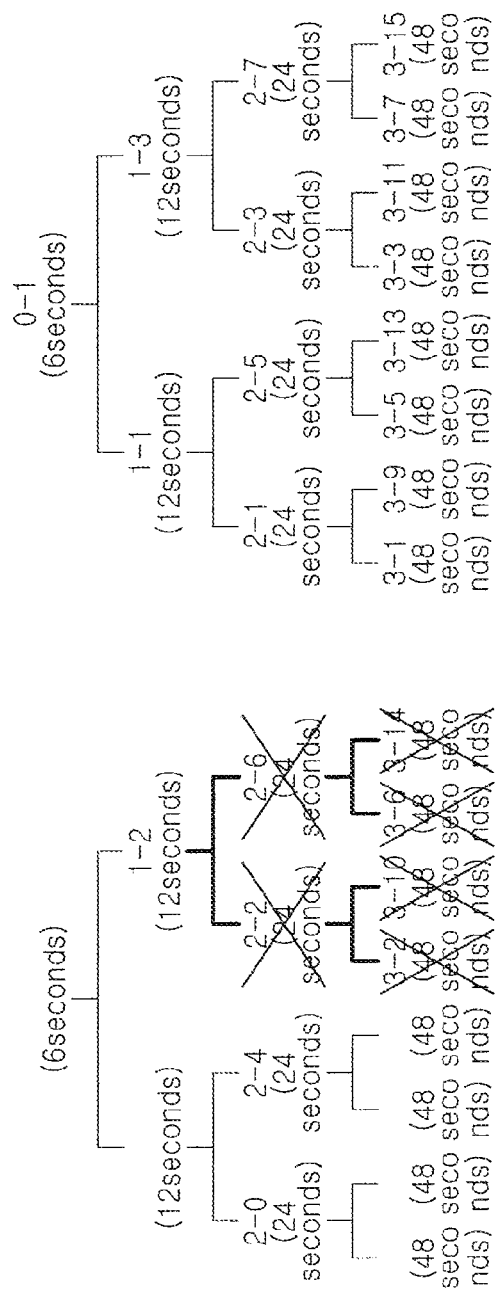

In the state of FIG. 4C, if yet another terminal makes a time slot allocation request for sending information through the 12-seconds transmission cycle message, the number of cases of allocation for the 12-seconds transmission cycle message includes the time slot 1-2 to the time slot 1-3. Here, if the time slot 1-1 or the time slot 1-3 is allocated, the number of cases of allocation for the time slot 0-1 is deleted, and the allocation of a time slot for the 6-seconds transmission cycle message is impossible. It is thus advantageous to maintain the number of cases of allocation for the time slot 0-1 by allocating the time slot 1-2. FIG. 4D shows the degree of identification for the number of cases of time slot allocation after the time slot 1-2 was allocated.

Figure 4E:
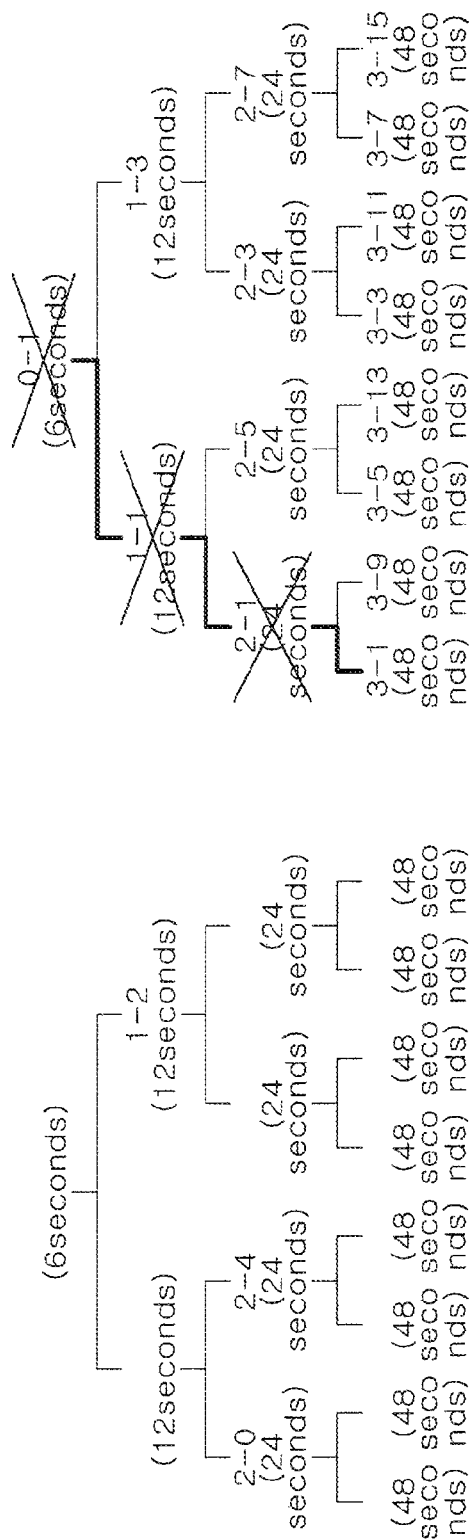

In the state of FIG. 4D, it is assumed that a terminal has requested the time slot having the 48-seconds transmission cycle. In this case, the network central station 120 searches for an optimum time slot through the degree of identification for the number of cases of time slot allocation at a point of time when the allocation request is received. One of allocable time slots is randomly selected because the number of cases of time slot allocation for the 48-seconds transmission cycle message is the same in the state of FIG. 4D. The degree of identification and the number of cases of time slot allocation are shown in FIG. 4E when it is assumed that the network central station 120 selects the time slot 3-1 and allocates the time slot 3-1 to the terminal. Assuming that the existing allocated time slot 2-0 has been withdrawn by the network central station 120 in the state of FIG. 4E, the degree of identification for the number of cases of time slot allocation is changed as in FIG. 4F.

Figure 4F:
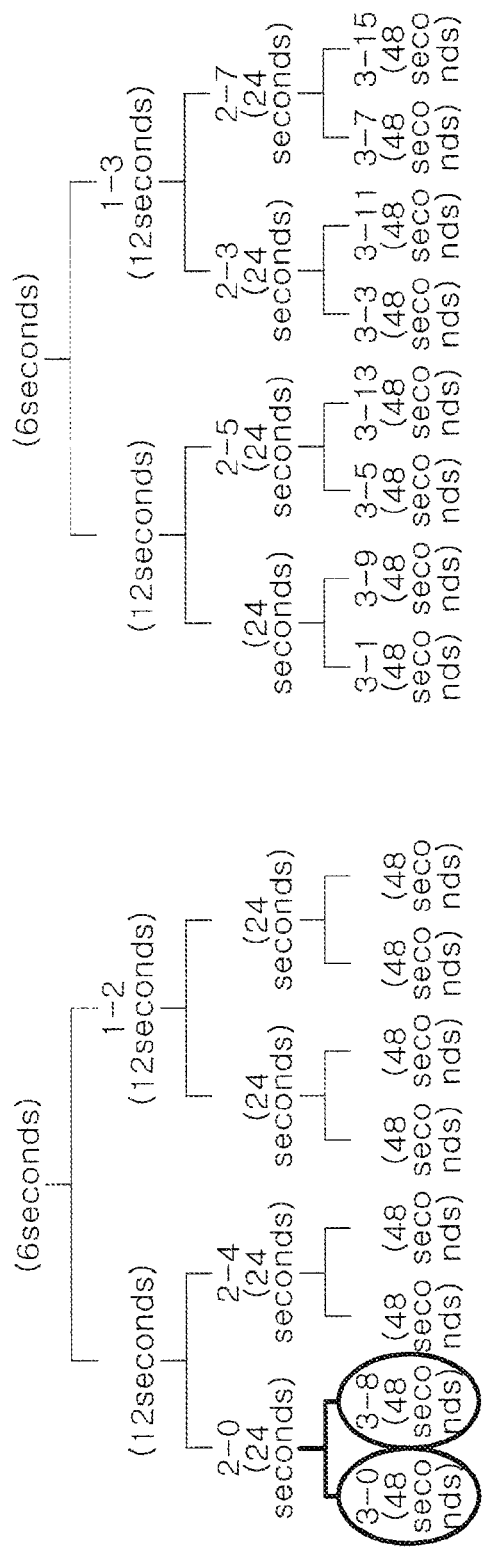

In the state of FIG. 4F, if a terminal requests the time slot having the 6-seconds transmission cycle, the time slot cannot be allocated because the time slot of the 6-seconds transmission cycle does not exist in the degree of identification for the number of cases of time slot allocation of FIG. 4F. This is because the time slot 3-1 has been allocated in FIG. 4E and the number of cases of the time slot of the 6-seconds transmission cycle has all disappeared. When the time slot is allocated, the time slot of the 6-seconds transmission cycle is inevitably abandoned in order to allocate the time slot of the 48-seconds transmission cycle. However, since the time slot 2-0 is subsequently recovered, the time slot 3-1 is no longer an optimum time slot of the 48-seconds transmission cycle. This is because time slots to the terminal has been frequently allocated and withdrawn during the operation of the TDMA network and there is a difference in the number of cases of the time slot used between a point of time when the time slot is allocated and a point of time after the time slot was allocated. That is, at the point of time when the time slot was allocated, the time slot was an optimum time slot. After the time slot was allocated, the allocated time slot is no longer an optimum time slot because a terminal has returned a time slot. Accordingly, there is a problem in that efficiency in operating time slots is low.

Figure 6A:
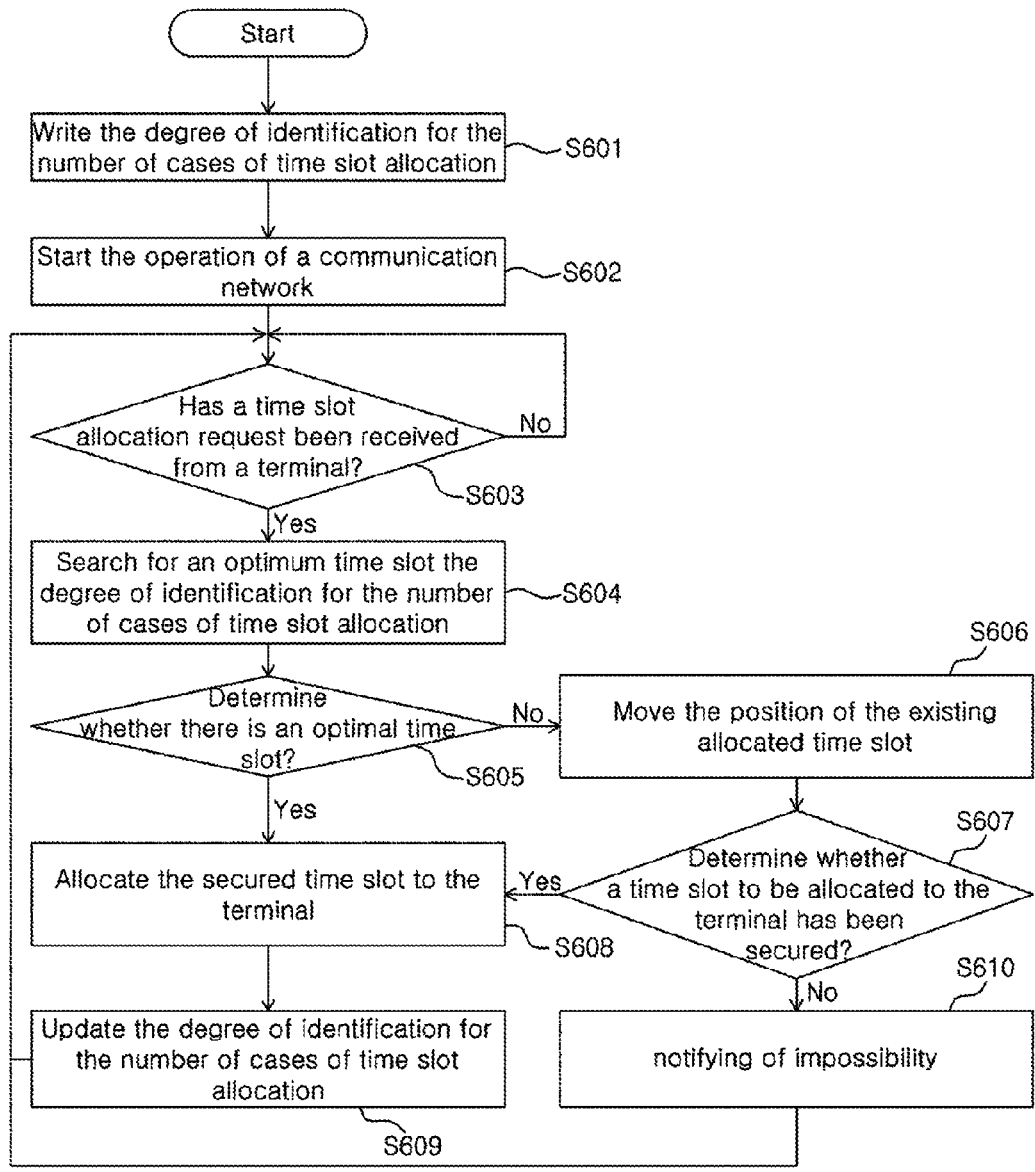
FIG. 6A is a flowchart illustrating a method of allocating a time slot using the movement of a time slot position when the allocation of a time slot requested by a terminal is impossible according to the present invention.
Figure 6B:
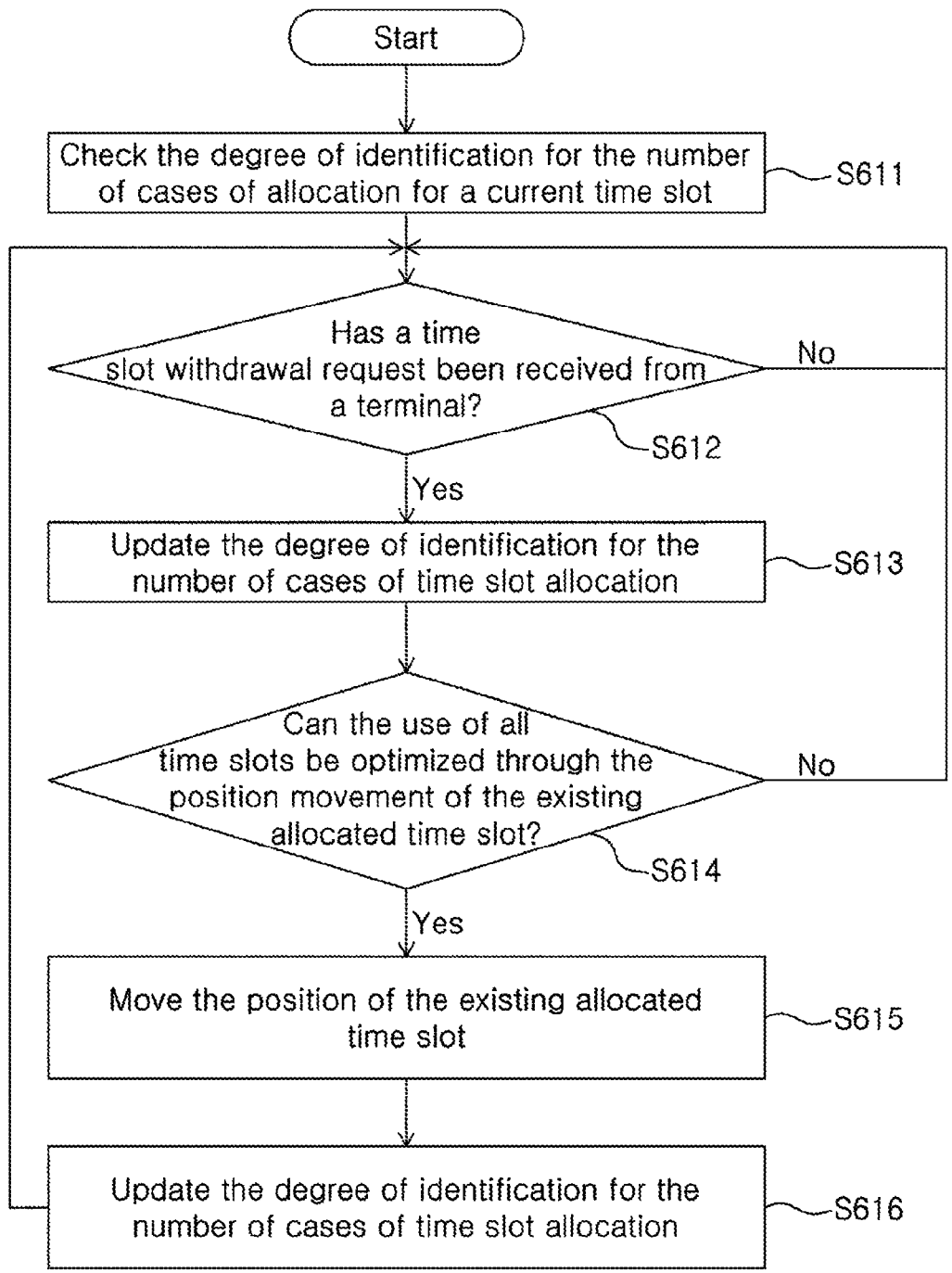
FIG. 6B is a flowchart illustrating a method of moving the position of a time slot for optimizing the present condition of all time slots used in the state in which a time slot allocated to a terminal has been withdrawn according to the present invention.

FIGS. 6A and 6B are flowcharts illustrating a method of allocating and withdrawing a time slot using the position movement of a time slot according to the present invention in order to solve the above problem.

More particularly, FIG. 6A shows a flowchart in which a time slot is secured through the position movement of the existing allocated time slot when an optimum time slot is determined not to exist in the state when a time slot allocation request from a terminal has been received. The method of allocating a time slot using the position movement of a time slot of FIG. 6A includes the step S601 of writing a degree of identification for the number of cases of time slot allocation, the step S602 of operating a communication network, the step S603 of determining whether transmission cycle information and a time slot allocation request have been received from a terminal, and the step S604 of searching for an allocable optimum time slot using the transmission cycle information and the degree of identification of the terminal, the step S605 of determining whether there is an optimal time slot, the step S606 of moving the position of the existing allocated time slot if, as a result of the determination, an optimum time slot does not exist, the step S607 of determining whether a time slot to be allocated to the terminal has been secured, the step S608 of allocating the secured time slot to the terminal if, as a result of the determination, the time slot to be allocated to the terminal has been secured, and the step S609 of updating the degree of identification for the number of cases of time slot allocation.

Furthermore, the method of allocating a time slot using the position movement of a time slot may include the step S608 of allocating an allocable time slot to the terminal and the step S609 of updating the degree of identification for the number of cases of time slot allocation, if there is an allocable time slot as the result of searching for an optimum time slot using the transmission cycle information and the degree of identification of the terminal.

Furthermore, the method of allocating a time slot using the position movement of a time slot may further include the step S610 of notifying that a time slot cannot be allocated to the terminal, if a time slot to be allocated to the terminal is determined not to have been secured.

If the method of FIG. 6A is applied, the method of FIG. 3B is applied to a method of the network central station controller 121 withdrawing a time slot in response to a slot withdrawal request from a terminal.

Meanwhile, FIG. 6B is a flowchart illustrating a method of moving the position of a time slot in order to optimize the present use condition of all time slots in the state in which a time slot allocated to a terminal has been withdrawn according to the present invention. As shown in FIG. 6B, the method of withdrawing a time slot using the position movement of a time slot according to the present invention includes the step S611 of checking the degree of identification for the number of cases of time slot allocation at a point of time when a time slot is withdrawn, the step S612 of determining whether a time slot withdrawal request has been received from a terminal, the step S613 of updating the degree of identification for the number of cases of time slot allocation according to the withdrawal of the time slot, the step S614 of determining whether the use of all time slots can be optimized through the position movement of the existing allocated time slot, the step S615 of moving the position of the existing allocated time slot if, as a result of the determination, the use of all time slots can be optimized, and the step S616 of updating the degree of identification for the number of cases of time slot allocation.

Furthermore, if the method of FIG. 6B is applied, the method of FIG. 3A is applied to the method of the network central station controller 121 allocating a time slot in response to a time slot allocation request from a terminal.

In order to help understanding of the method of allocating a time slot according to an embodiment of the present invention, whether the problems of the conventional method of allocating a time slot can be solved is determined.

Figure 5A:
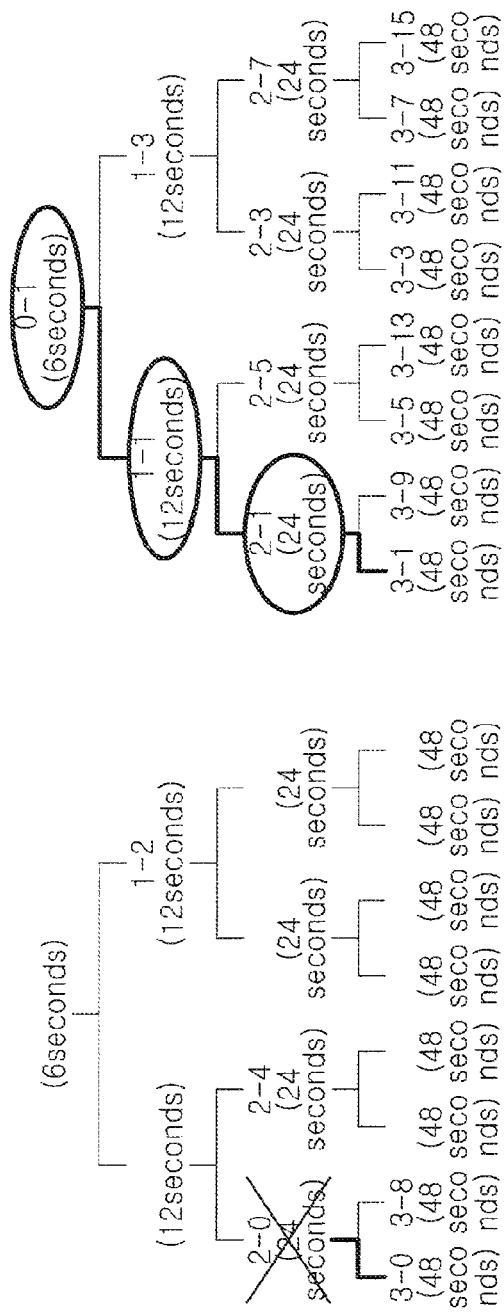
FIGS. 5A and 5B are exemplary diagrams illustrating a method of allocating and withdrawing a time slot using the movement of a time slot position according to the present invention.
Figure 5B:
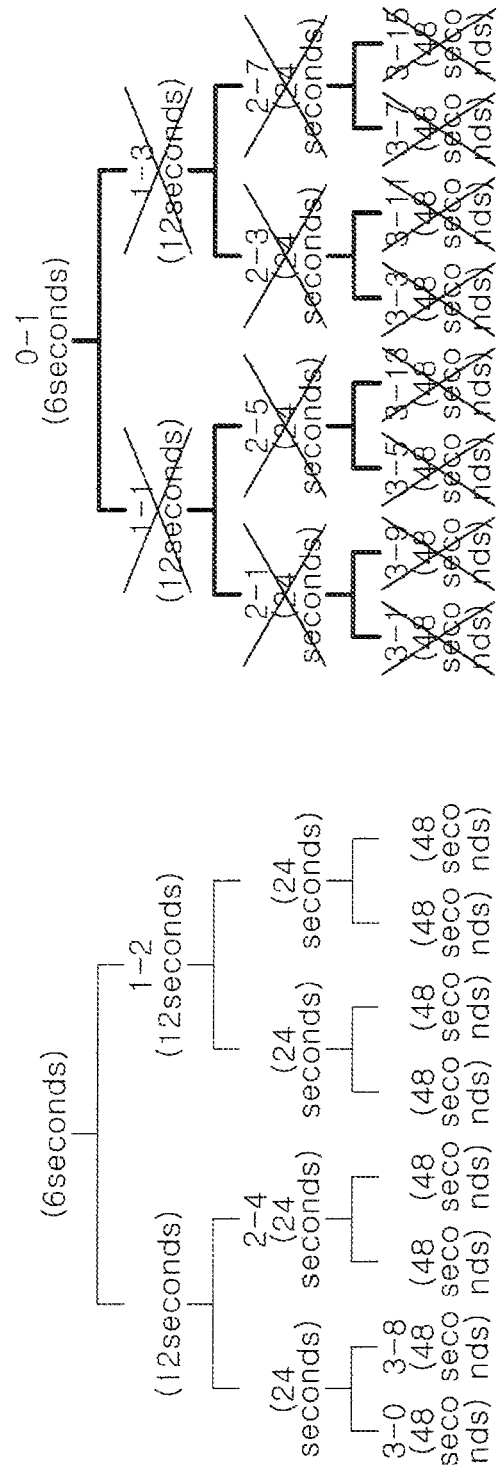

FIGS. 5A and 5B are exemplary diagrams showing the method of allocating a time slot using the position movement of a time slot according to the present invention in order to solve the problem of the conventional method of allocating a time slot. In the state of FIG. 4F, to allocate the time slot of the 6-seconds transmission cycle is impossible. That is, in the state of FIG. 4F, in order to secure the time slot of the 6-seconds transmission cycle whole moving the position of an allocated time slot to a minimum, the time slot 1-0 must be revived by moving the time slot 3-1 to the time slot 3-0 or 3-8. In this embodiment, it is assumed that the network central station controller 121 has determined to move the time slot 3-1 to the time slot 3-0. That is, the network central station 120 instructs the terminal, now using the time slot 3-1, to use the time slot 3-0 according to the determination of the network central station controller 121. The controller 133 of the terminal changes a time slot, allocated thereto, to the time slot 3-0. After the time slot is changed, the controller 133 reports the change to the network central station 120. The network central station controller 121 updates the degree of identification for the number of cases of time slot allocation. The updated degree of identification is shown in FIG. 5A. If the time slot of the 6-seconds transmission cycle is allocated in the state of FIG. 5A, after the time slot 0-1 is allocated, the network central station controller 121 updates the degree of identification for the number of cases of time slot allocation, and a result thereof is show in FIG. 5B.

If the method of securing a time slot is used, a time slot can be secured through the position movement of a time slot in a process of allocating a time slot to a terminal as shown in FIG. 6A. Furthermore, a time slot can be secured through the position movement of a time slot in a process of withdrawing a time slot from a terminal as shown in FIG. 6B.

As described above, according to the present invention, if the method of allocating and withdrawing a time slot is used, time slots can be efficiently used by controlling an inefficient allocation operation of a time slot due to the frequent allocation and withdrawal of a time slot in a TDMA communication system.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of allocating a time slot using a position movement of a time slot, the method comprising the steps of:
    writing a degree of identification for the number of cases of time slot allocation;
    initiating an operation of a communication network; determining whether transmission cycle information and a time slot allocation request have been received from a terminal; and
    searching for an allocable time slot based on the transmission cycle information and the degree of identification, wherein the method further comprises the steps of:
    if, as a result of searching, an allocable time slot does not exist,
    moving a position of an existing allocated time slot; determining whether a time slot to be allocated to the terminal has been secured;
    if, as a result of the determination, a time slot to be allocated to the terminal has been secured, allocating the secured time slot to the terminal; and
    updating the degree of identification for the number of cases of time slot allocation.

2. The method as claimed in claim 1, further comprising the steps of:
    if an allocable time slot exists as a result of searching for the allocable time slot based on the transmission cycle information and the degree of identification of the terminal,
    allocating the allocable time slot to the terminal; and updating the degree of identification for the number of cases of time slot allocation.

3. The method as claimed in claim 1, further comprising the step of informing that a time slot cannot be allocated to the terminal, if a time slot to be allocated to the terminal has not been secured even though the position of the existing allocated time slot has been moved.

4. A method of withdrawing a time slot using a position movement of a time slot, the method comprising the steps of:
    checking a degree of identification for the number of cases of time slot allocation;
    determining whether a time slot withdrawal request has been received from a terminal;
    updating the degree of identification for the number of cases of time slot allocation according to a withdrawal of a time slot; and
    determining whether a use of all time slots can be optimized through a position movement of an existing allocated time slot,
    if, as a result of the determination, the use of all the time slots can be optimized through the position movement of the existing allocated time slot, the method further comprises the steps of:
    moving the position of the existing allocated time slot; and
    updating the degree of identification for the number of cases of time slot allocation.

5. A Time Division Multiple Access (TDMA) communication system including a TDMA network, a network central station, and terminals,
    wherein the network central station comprises:
    a receiver for receiving transmission cycle information and time slot allocation requests from the terminals;
    a network central station controller for writing a degree of identification for the number of cases of time slot allocation according to the transmission cycle information, searching for an allocable optimum time slot, and withdrawing a time slot from a terminal which has finished communication;
    a time slot management unit for allocating a time slot to the terminal based on the degree of identification for the number of cases of time slot allocation written by the network central station controller; and
    a transmitter for transmitting information about the allocated time slot to the terminal,
    wherein the network central station controller searches for a time slot of a transmission cycle that has been requested by the terminal through a position movement of a time slot, and
    the time slot management unit allocates the searched time slot to the terminal.

6. The TDMA communication system as claimed in claim 5, wherein if the position of the time slot has been moved, the network central station controller updates the degree of identification for the number of cases of time slot allocation.

7. The TDMA communication system as claimed in claim 5, wherein if an allocable time slot is not searched by searching for a time slot of a transmission cycle that has been requested by the terminal through the position movement of the time slot, the network central station controller informs that a time slot cannot be allocated to the terminal.

8. The TDMA communication system as claimed in claim 5, wherein the terminal comprises:
- a transmitter for transmitting information about the transmission cycle and the time slot allocation request to the network central station and transmitting information about a time slot withdrawal request when communication is finished;
- a receiver for receiving time slot allocation information from the network central station; and
- a controller for operating time slots based on the time slot allocation information.

* * * * *